(12) United States Patent
Li et al.

(10) Patent No.: US 12,004,553 B2
(45) Date of Patent: Jun. 11, 2024

(54) METHOD FOR EXTRACTING TAR AROMA COMPONENTS FROM WITHIN CIGARETTE BUTTS AND APPLICATION THEREOF IN CIGARETTES

(71) Applicant: INNER MONGOLIA KUNMING CIGARETTE CO., LTD., Inner Mongolia (CN)

(72) Inventors: Liqun Li, Inner Mongolia (CN); Jie Hao, Inner Mongolia (CN); Chen Chen, Inner Mongolia (CN); Junsong Zhang, Inner Mongolia (CN); Xudong Ji, Inner Mongolia (CN); Chunsheng Guo, Inner Mongolia (CN); Yajun Ye, Inner Mongolia (CN); Shu Tian, Inner Mongolia (CN); Xudong Wang, Inner Mongolia (CN); Yuemei Qiao, Inner Mongolia (CN); Ruili Li, Inner Mongolia (CN); Yuanyang Zhu, Inner Mongolia (CN); Qingxiang Li, Inner Mongolia (CN)

(73) Assignee: INNER MONGOLIA KUNMING CIGARETTE CO., LTD., Hohhot (CN)

( * ) Notice: Subject to any disclaimer, the term of this patent is extended or adjusted under 35 U.S.C. 154(b) by 0 days.

(21) Appl. No.: 17/779,901

(22) PCT Filed: Nov. 16, 2020

(86) PCT No.: PCT/CN2020/129089
§ 371 (c)(1),
(2) Date: May 25, 2022

(87) PCT Pub. No.: WO2021/104081
PCT Pub. Date: Jun. 3, 2021

(65) Prior Publication Data
US 2023/0000133 A1 Jan. 5, 2023

(30) Foreign Application Priority Data
Nov. 27, 2019 (CN) .......................... 201911179304.8

(51) Int. Cl.
| | | |
|---|---|---|
| *A24B 15/24* | (2006.01) | |
| *A24B 3/14* | (2006.01) | |
| *A24B 15/12* | (2006.01) | |
| *A24B 15/26* | (2006.01) | |
| *A24D 1/20* | (2020.01) | |
| *A24D 3/14* | (2006.01) | |
| *A24D 3/17* | (2020.01) | |
| *B01D 3/10* | (2006.01) | |
| *B01D 3/12* | (2006.01) | |
| *B01D 11/02* | (2006.01) | |

(52) U.S. Cl.
CPC .............. *A24B 15/241* (2013.01); *A24B 3/14* (2013.01); *A24B 15/12* (2013.01); *A24B 15/26* (2013.01); *A24D 1/20* (2020.01); *A24D 3/14* (2013.01); *A24D 3/17* (2020.01); *B01D 3/10* (2013.01); *B01D 3/12* (2013.01); *B01D 11/0265* (2013.01); *B01D 11/0288* (2013.01)

(58) Field of Classification Search
CPC ...... A24B 15/24; A24B 15/241; A24B 15/243
See application file for complete search history.

(56) References Cited

U.S. PATENT DOCUMENTS

2013/0160777 A1* 6/2013 Murphy ................. A24B 15/24
131/369

FOREIGN PATENT DOCUMENTS

| CN | 101985693 A | 3/2011 |
|---|---|---|
| CN | 102559388 A | 7/2012 |
| CN | 105105317 A | 12/2015 |

(Continued)

OTHER PUBLICATIONS

Huang, Dengfeng, "Studies on Recycling and Use of the Cigarette Butts"; Chinese Master's Theses Full-text Database, Engineering Science vol. 1, No. 2, Feb. 15, 2013 (Feb. 15, 2013); ISSN: 1674-0246, B027-744, pp. 1-6, (20 pages). (Year: 2013).*

(Continued)

*Primary Examiner* — Philip Y Louie
*Assistant Examiner* — Yana B Krinker
(74) *Attorney, Agent, or Firm* — STAAS & HALSEY LLP

(57) ABSTRACT

The present disclosure provides a method for extracting tar aroma components from a cigarette butt and use of the tar aroma components in a cigarette. The method includes the following steps: (1) adding the cigarette butt to an extraction solvent, and carrying out ultrasound-assisted extraction to obtain an extraction solution; (2) centrifuging the extraction solution, and carrying out vacuum distillation on the supernatant to obtain a concentrated extractum; and (3) carrying out molecular distillation on the concentrated extractum, and collecting a light fraction of the molecular distillation to obtain the tar aroma components. In the present disclosure, the cigarette butt is used as a raw material, through the ultrasound-assisted extraction and separation by the molecular distillation to extract the tar, harmful substances in the tar are removed, and the aroma components are retained. The tar aroma components are applied to a heat-not-burn cigarette, so that the aroma, smoke and taste characteristics of the heat-not-burn cigarette are improved, and the problems of insipidness and uneven aroma release of the heat-not-burn cigarette are solved effectively.

5 Claims, No Drawings

(56) References Cited

FOREIGN PATENT DOCUMENTS

| CN | 105779128 | A | | 7/2016 | |
|---|---|---|---|---|---|
| CN | 105861154 | A | | 8/2016 | |
| CN | 106563013 | A | | 1/2017 | |
| CN | 106579545 | A | | 4/2017 | |
| CN | 109959649 | A | | 7/2019 | |
| CN | 109959649 | A | | 7/2019 | |
| CN | 110236231 | A | | 9/2019 | |
| CN | 110236231 | A | * | 9/2019 | ........... A24F 47/008 |
| CN | 111035055 | A | | 4/2020 | |
| JP | 63-270059 | | | 11/1988 | |
| WO | WO 2017/181684 | A1 | | 10/2017 | |

OTHER PUBLICATIONS

CN-110236231-A (Machine Translation) [online], [retrieved on May 13, 2023], retrieved from ESPACENET (https://worldwide.espacenet.com/) (Year: 2019).*

Notification of the First Office Action dated Jan. 12, 2021 in corresponding Chinese Patent Application No. 201911179304.8 (20 pages) (8 pages English Translation).

Notification of the Second Office Action dated Feb. 26, 2021 in corresponding Chinese Patent Application No. 201911179304.8 (3 pages) (3 pages English Translation).

Notice of Allowance dated Mar. 24, 2021 in corresponding Chinese Patent Application No. 201911179304.8 (4 pages) (3 pages English Translation).

Huang, Dengfeng, "Studies on Recycling and Use of the Cigarette Butts"; Chinese Master's Theses Full-text Database, Engineering Science vol.1, No.2, Feb. 15, 2013 (Feb. 15, 2013); ISSN: 1674-0246, B027-744, pp. 1-6, (20 pages).

International Search Report (Form PCT/ISA/210); dated Feb. 19, 2021 in corresponding PCT Application No. PCT/CN2020/129089 (4 pages) (3 pages English Translation).

Written Opinion (Form PCT/ISA/237); dated Feb. 19, 2021 in corresponding PCT Application No. PCT/CN2020/129089 (4 pages).

Huang Dengfeng, et al., "A Thesis for the Degree of Master: Studies on recycling and use of the Cigarette Butts", Qiqiharn University, May 2012.

Japanese Office Action issued in counterpart Japanese Application No. dated Dec. 6, 2022.

* cited by examiner

METHOD FOR EXTRACTING TAR AROMA COMPONENTS FROM WITHIN CIGARETTE BUTTS AND APPLICATION THEREOF IN CIGARETTES

CROSS REFERENCE TO RELATED APPLICATIONS

This application is a U.S. National Stage Application under 35 U.S.C. § 371 of PCT International Patent Application No. PCT/CN2020/129089, filed on Nov. 16, 2020, which claims the foreign priority benefit under 35 U.S.C. § 119 of Chinese Patent Application No. 201911179304.8, filed on Nov. 27, 2019 in the China National Intellectual Property Administration, the contents of which International Patent Application and the Chinese Application are incorporated by reference herein in their entirety.

FIELD

The present disclosure relates to a method for extracting tar aroma components from a cigarette butt and use of the tar aroma components in a cigarette, belonging to the technical field of tobacco technology.

BACKGROUND

China consumes a large number of cigarettes every year, and then a large number of discarded cigarette butts are produced, causing great pollution to the environment. The discarded cigarette butts contain a large amount of tar. Cigarette tar contains not only aroma components that have a positive effect on sensory quality, such as ketones, furans and pyrazines, but also nicotine that can improve consumers' physiological satisfaction, and harmful substances that have an obvious negative effect on sensory quality, such as amines and aldehydes.

Therefore, it is of great significance to extract tar in the discarded cigarette butts and prepare an extract with certain properties or effects.

In recent years, new tobacco products, such as electronic cigarettes and heat-not-burn cigarettes, have developed rapidly. A heat-not-burn cigarette is a low-temperature cigarette that enables tobacco leaves to be heated just enough to give off the aroma instead of burning the tobacco leaves. Usually, smoking an ordinary cigarette will produce many harmful substances due to the high temperature of 350° C. to 600° C., while the low-temperature cigarette allows the tobacco leaves to be heated at 300° C. or below, so fewer harmful substances will be produced. Compared with the traditional cigarette, the heat-not-burn cigarette has the advantages of lower heating temperature and less harmful substances released, but it is not easily accepted by smokers due to its problems of insipidity and uneven aroma release.

CN109959649A discloses a cigarette tar extract with chemiluminescent properties. A method of preparing the cigarette tar extract includes the step of: adding cigarette tar to a reagent for extraction to obtain the cigarette tar extract. The cigarette tar may be obtained by the following steps: smoking a cigarette, filtering the generated smoke, and collecting smoke particulate matters to obtain the cigarette tar. The cigarette tar extract in this patent is obtained by ultrasound-assisted extraction in an open system under natural light conditions, so a luminescent substance contained has stable properties and are insensitive to light, oxygen and temperature, etc. This extract has a wide luminescence response range for pH of a medium, and is capable of being subjected to a chemiluminescent reaction under acidic, neutral or alkaline conditions. In this patent, the cigarette tar is the tar in the smoke particulate matters, and the prepared tar extract is luminescent, so this patent does not involve extraction of tar in the cigarette butt to obtain the tar aroma components CN102559388A discloses a tobacco essential oil and a method for preparing the same, and use of the tobacco essential oil in cigarettes. The tobacco essential oil is prepared by the following method including: taking discarded/defective tobacco wastes, carrying out extraction with an organic solvent, obtaining a crude extract of essential oil, introducing water vapor, carrying out condensation, and separating oil and water to obtain the tobacco essential oil. In this patent, the tobacco essential oil is added to a cigarette tobacco blend as an aroma enhancer, and can enhance the original aroma of tobacco, improve the aroma quality and quantity of cigarettes, reduce the irritancy and offensive odor of the tobacco and soften the smoke. The discarded/defective tobacco wastes produced in the cigarette production process, which are used as a raw material, are free of tar, so this patent does not involve an extraction process for the cigarette butt.

SUMMARY

The present disclosure aims to provide a method for extracting tar aroma components from a cigarette butt. By using the cigarette butt as a raw material, ultrasound-assisted extraction and separation by molecular distillation are used to obtain the tar aroma components, and the obtained tar aroma components are applied to a cigarette to enhance the aroma of the cigarette.

In the present disclosure, the cigarette butt used as the raw material is discarded by people on the roadside or in an ashtray, so the method has the advantages of wide raw material sources and low cost. A yellow cigarette butt is selected due to its higher tar content.

In one aspect, the present disclosure provides a method for extracting tar aroma components from a cigarette butt, including the following steps:

(1) adding the cigarette butt to an extraction solvent, and carrying out ultrasound-assisted extraction to obtain an extraction solution;

(2) centrifuging the extraction solution, and carrying out vacuum distillation on the supernatant to obtain a concentrated extractum; and (3) carrying out molecular distillation on the concentrated extractum, and collecting a light fraction of the molecular distillation to obtain the tar aroma components.

Further, in the step (1), a ratio of the cigarette butt to the extraction solvent is 1 g:5-20 ml.

The extraction solvent is at least one of methanol, ethanol, petroleum ether, n-hexane, acetone, dichloromethane and ethyl acetate.

Preferably, the ultrasound-assisted extraction is carried out with an ultrasound power of 60-120 W for 5-30 min. More preferably, the ultrasound power is 70-110 W, a lower limit of the ultrasound power is selected from 80 W, 90 W or 100 W, and an upper limit of the ultrasound power is selected from 80 W, 90 W or 100 W. More preferably, the time of the ultrasound-assisted extraction is 10-25 min, a lower limit of the time of the ultrasound-assisted extraction is selected from 11 min, 12 min, 13 min, 14 min, 15 min, 16 min, 17 min, 18 min, 19 min, 20 min, 21 min, 22 min, 23 min or 24 min, and an upper limit of the time of the ultrasound-assisted extraction is selected from 11 min, 12 min, 13 min, 14 min, 15 min, 16 min, 17 min, 18 min, 19 min, 20 min, 21 min, 22 min, 23 min or 24 min.

Further, in the step (2), the centrifuging is carried out at 500-2000 r/min for 1-3 min.

The vacuum distillation is carried out at a temperature of 25-45° C. under a vacuum degree of 0.06-0.08 Mpa.

Further, in the step (3), the molecular distillation is two-stage molecular distillation, and light fractions of first-stage molecular distillation and second-stage molecular distillation are mixed.

Preferably, the first-stage molecular distillation is carried out at a heating temperature of 50-80° C. under a pressure of 100-200 Pa at a feed rate of 300-600 mL/h and a film wiping speed of 200-300 rpm. More preferably, the first-stage molecular distillation is carried out at a heating temperature of 60-70° C. More preferably, the pressure is 110 Pa-190 Pa. A lower limit of the pressure is selected from 120 Pa, 130 Pa, 140 Pa, 150 Pa, 160 Pa, 170 Pa or 180 Pa, and an upper limit of the pressure is selected from 120 Pa, 130 Pa, 140 Pa, 150 Pa, 160 Pa, 170 Pa or 180 Pa.

Preferably, the second-stage molecular distillation is carried out at a heating temperature of 90-110° C. under a pressure of 40-60 Pa at a feed rate of 300-600 mL/h and a film wiping speed of 200-300 rpm. More preferably, the second-stage molecular distillation is carried out at a heating temperature of 95-105° C. under a pressure of 45-55 Pa. Most preferably, the second-stage molecular distillation is carried out at a heating temperature of 100° C. under a pressure of 50 Pa.

Further, the method further includes a step of pretreating the cigarette butt.

Preferably, the pretreating specifically includes: tearing off outer wrapping paper from the cigarette butt, and cutting a tow into small segments with a length of less than 1 cm.

In another aspect, the present disclosure further provides tar aroma components prepared by the method.

In still another aspect, the present disclosure further provides a flavor, containing the tar aroma components.

In yet another aspect, the present disclosure further provides use of the tar aroma components or the flavor in the preparation of a cigarette.

Preferably, the cigarette is a heat-not-burn cigarette.

Preferably, the tar aroma components are added to a filter and a reconstituted tobacco blend of the cigarette. Preferably, the amount of the tar aroma components added is 2-5% of the weight of the reconstituted tobacco blend of the cigarette.

The present disclosure has the following beneficial effects:

(1) Through the ultrasound-assisted extraction and separation by the molecular distillation to extract the tar, harmful substances in the tar are removed, and the aroma components are retained. The tar aroma components are applied to the heat-not-burn cigarette, so that the aroma, smoke and taste characteristics of the heat-not-burn cigarette are improved, and the problems of insipidness and uneven aroma release of the heat-not-burn cigarette are solved effectively.

(2) By optimizing the conditions of the ultrasound-assisted extraction and separation by the molecular distillation, the tar aroma components are extracted from the cigarette butt at a higher extraction yield. The discarded cigarette butt is used as the raw material, which can not only avoid the cigarette butt from polluting the environment, but also make use of a byproduct tar after smoking the cigarette.

DETAILED DESCRIPTION OF THE EMBODIMENTS

The present disclosure will be described in detail in conjunction with specific examples. The following examples are only explanations for those skilled in the art to understand the technical solution of the present disclosure and to realize or use the present disclosure, and are not intended to limit the protection range of the present disclosure.

Unless otherwise specified, the raw materials and equipment used in the present disclosure are those available from the market or commonly used in the art.

The methods in the examples, unless otherwise specified, are conventional methods in the art.

Example 1 Extraction of Tar Aroma Components from Cigarette Butt

A method for extracting tar aroma components from a cigarette butt included the following steps:

(1) pretreating of the cigarette butt: outer wrapping paper of the cigarette butt was torn off, and a tow was cut into small segments with a length of less than 1 cm;

(2) 100 g of the pretreated cigarette butt was added to 1 L of petroleum ether, and ultrasound-assisted extraction was carried out with an ultrasound power of 100 W for 20 min to obtain an extraction solution;

(3) the extraction solution was centrifuged at 1000 r/min for 2 min, and vacuum distillation was carried out on the supernatant at 30° C. under 0.07 Mpa to obtain a concentrated extractum; and (4) two-stage molecular distillation was carried out on the concentrated extractum, wherein first-stage molecular distillation was carried out at a heating temperature of 60° C. under a pressure of 150 Pa at a feed rate of 400 mL/h and a film wiping speed of 250 rpm; and second-stage molecular distillation was carried out at a heating temperature of 100° C. under a pressure of 50 Pa at a feed rate of 400 mL/h and a film wiping speed of 250 rpm; and light fractions of the first-stage molecular distillation and the second-stage molecular distillation were mixed.

The light fraction was detected by GC/MS. Components in the light fraction were furfural, furfuryl alcohol, ethylene glycol diacetate, 1-(1,3-dioxolan-2-yl)acetone, 4-cyclopentene-1,3-dione, methylcyclopentenolone, nicotine, 2-acetylfuran, 2(5H)-furanone, 5-methylfurfural, 3-methyl-2-cyclopenten-1-one, methylcyclopentenolone, benzyl alcohol, 2,3-dimethyl-2-cyclopentenone, ethylcyclopentenolone, 5-hydroxymethylfurfural, vanillin, megastigmatrienone A, 2,4,4-trimethylpentane-1,3-diyl bis(2-methylpropionate), farnesol, phthalic acid 1-butyl 2-isobutyl ester, scopoletin and tributyl prop-1-ene-1,2,3-tricarboxylate.

GC/MS conditions:
HP 6890/5973 GC-MS
(1) GC Conditions:
Chromatographic column: ULTRA2 (50 m×0.2 mm i.d× 0.33 μm d.f.)
Detector: MS
Carrier gas, flow rate: He, 0.6 ml/min
Temperature of injection port: 290° C.
Temperature program: 80° C. (1 min) 2° C./min→280° C. (10 min)
Split ratio, injection volume: 1:10, 2 μl
(2) GC/MS Conditions:
GC conditions: the same as above
Temperature of transfer line: 230° C.
Temperature of ion source: 230° C.

Ionization energy: 70 eV

Mass range: 30-350 u

Carrier gas: He

MS spectra: NIST Library

Example 2 Use of Tar Aroma Components in Cigarette

The light fraction prepared in Example 1 was added to a condensation auxiliary material in an amount of 3% (by mass) of an HnB reconstituted tobacco blend to prepare an HnB sample A with tar aroma components.

The light fraction prepared in Example 1 was added to a reconstituted tobacco blend in an amount of 2% (by mass) of the HnB reconstituted tobacco blend to prepare an HnB sample B with tar aroma components.

The light fraction prepared in Example 1 was added to a filter auxiliary material in an amount of 5% (by mass) of the HnB reconstituted tobacco blend to prepare an HnB sample C with tar aroma components.

After the cigarette samples prepared by the above solution and a cigarette without the tar aroma components were equilibrated in a constant-temperature and constant-humidity environment of (20±1°) C. and (60±3)% RH for 24 h, 10 or more smoking evaluators were organized to perform sensory evaluation on the cigarette samples with reference to Tobacco in processing-Sensory evaluation methods (YC/T 415-2011). The evaluation results are shown in Table 1.

TABLE 1

Sensory evaluation results

| Evaluation sample | | Control sample | HnB sample A | HnB sample B | HnB sample C |
|---|---|---|---|---|---|
| Aroma characteristics | Quality of aroma | 5.0 | 5.5 | 5.25 | 5.25 |
| | Quantity of aroma | 5.0 | 5.5 | 5.5 | 5.5 |
| | Stability | 4.0 | 4.25 | 4.25 | 4.25 |
| | Offensive odor | 5.0 | 5.25 | 5.25 | 5.5 |
| | Plumpness of aroma | 4.0 | 5.5 | 5.0 | 5.5 |
| Smoke characteristics | Concentration | 5.0 | 5.5 | 5.5 | 6.0 |
| | Strength | 5.0 | 5.5 | 5.5 | 6.0 |
| | Harshness | 5.0 | 5.5 | 5.5 | 5.5 |
| | Agglomeration | 5.0 | 5.5 | 5.5 | 5.5 |
| | Stability | 4.0 | 4.25 | 4.25 | 4.25 |
| Taste characteristics | Irritancy | 5.0 | 5.5 | 5.5 | 5.25 |
| | Dry feeling | 5.0 | 5.5 | 5.5 | 5.5 |
| | Clean degree | 5.0 | 5.5 | 5.5 | 5.5 |
| | Sweet aftertaste | 4.0 | 5.0 | 5.0 | 5.5 |

As shown in Table 1, compared with the control group, after the tar aroma components prepared in the example of the present disclosure was added, the smoke characteristics, the aroma characteristics and the taste characteristics of heat-not-burn cigarettes were improved to different degrees. The quantity of aroma and the plumpness of aroma of the cigarettes were improved significantly, and the other aroma characteristics were also improved. The concentration and strength of the smoke were increased, and the harshness and agglomeration were also improved. The irritancy was reduced, the dry feeling was decreased, and the sweet aftertaste was increased significantly. After the tar aroma components prepared in the example of the present disclosure was added, the problems of insipidness and insufficient plumpness of aroma of the heat-not-burn cigarettes were solved effectively.

Example 3 Selection of Conditions for Preparation Method

1. Selection of Extraction Solvent

Methanol, dichloromethane, anhydrous ethanol, glycerin, petroleum ether and polyethylene glycol 400 were respectively used to carry out ultrasound-assisted extraction on the pretreated discarded cigarette butt, wherein a ratio of material to liquid was 1:10 (g/mL), and the ultrasound-assisted extraction was carried out once with a ultrasound-assisted extraction power of 100 W for 20 min. The effects of different solvents on extraction effects (the amount of component extracted from per g of cigarette butt) were compared and analyzed. The detection results are shown in Table 2. As can be seen from Table 2, the anhydrous ethanol had the best extraction effects.

TABLE 2

Extraction effects of different organic solvents (mg/g)

| | | | Extraction solvent | | | | | |
|---|---|---|---|---|---|---|---|---|
| No. | Holding time/min | Component | Methanol | Dichloromethane | Anhydrous ethanol | Glycerin | Petroleum ether | Polyethylene glycol 400 |
| 1 | 11.087 | Furfural | 0.95 | 0.87 | 1.06 | 0.32 | 0.87 | 0.27 |
| 2 | 11.963 | Furfuryl alcohol | 1.02 | 0.99 | 1.13 | 0.28 | 0.88 | 0.25 |
| 3 | 12.428 | Ethylene glycol diacetate | 0.48 | 0.43 | 0.52 | 0.14 | 0.39 | 0.11 |
| 4 | 13.016 | 1-(1,3-dioxolan-2-yl)acetone | 0.45 | 0.43 | 0.51 | 0.15 | 0.43 | 0.12 |
| 5 | 13.258 | 4-cyclopentene-1,3-dione | 0.43 | 0.42 | 0.51 | 0.16 | 0.44 | 0.14 |
| 6 | 14.240 | Methylcyclopentenolone | 0.37 | 0.41 | 0.44 | 0.12 | 0.36 | 0.11 |
| 7 | 14.406 | Nicotine | 2.15 | 2.16 | 2.44 | 0.66 | 2.06 | 0.52 |
| 8 | 14.446 | 2-acetylfuran | 0.27 | 0.25 | 0.28 | 0.08 | 0.31 | / |
| 9 | 14.646 | 2(5H)-furanone | 0.41 | 0.42 | 0.42 | 0.11 | 0.43 | 0.24 |

TABLE 2-continued

Extraction effects of different organic solvents (mg/g)

| No. | Holding time/min | Component | Methanol | Dichloromethane | Anhydrous ethanol | Glycerin | Petroleum ether | Polyethylene glycol 400 |
|---|---|---|---|---|---|---|---|---|
| 10 | 16.934 | 5-methylfurfural | 1.30 | 1.47 | 1.56 | 0.43 | 1.44 | 0.36 |
| 11 | 17.051 | 3-methyl-2-cyclopenten-1-one | 0.82 | 0.81 | 0.87 | 0.26 | 0.80 | 0.18 |
| 12 | 20.257 | Methylcyclopentenolone | 1.73 | 1.38 | 1.67 | 0.47 | 1.52 | 0.31 |
| 13 | 20.545 | Benzyl alcohol | 0.43 | 0.41 | 0.48 | 0.14 | 0.43 | 0.13 |
| 14 | 20.745 | 2,3-dimethyl-2-cyclopentenone | 1.10 | 1.10 | 1.27 | 0.39 | 1.13 | 0.32 |
| 15 | 24.792 | Ethylcyclopentenolono | 0.51 | 0.46 | 0.53 | 0.18 | 0.44 | 0.14 |
| 16 | 30.262 | 5-hydroxymethylfurfural | 1.24 | 1.15 | 1.33 | 0.45 | 1.13 | 0.32 |
| 17 | 37.938 | Vanillin | 0.67 | 0.61 | 0.68 | 0.24 | 0.64 | 0.14 |
| 18 | 45.367 | Megastigmatrienone A | 1.02 | 0.84 | 0.99 | 0.34 | 0.91 | 0.22 |
| 19 | 45.820 | 2,4,4-trimethylpentane-1,3-diyl bis(2-methylpropionate) | 0.52 | 0.52 | 0.58 | 0.21 | 0.51 | 0.15 |
| 20 | 56.972 | Farnesol | 0.44 | 0.41 | 0.46 | 0.16 | 0.39 | 0.11 |
| 21 | 58.684 | Phthalic acid 1-butyl 2-isobutyl ester | 0.70 | 0.68 | 0.76 | 0.26 | 0.65 | 0.16 |
| 22 | 59.096 | Scopoletin | 0.63 | 0.59 | 0.61 | 0.24 | 0.59 | 0.13 |
| 23 | 64.684 | Tributyl prop-1-ene-1,2,3-tricarboxylate | 0.57 | 0.54 | 0.60 | 0.16 | 0.53 | 0.11 |
| | | Total amount | 18.19 | 17.35 | 19.70 | 5.95 | 17.28 | 4.54 |

2. Selection of Ultrasound-Assisted Extraction Time 100 g of the pretreated discarded cigarette butt was added to 1 L of anhydrous ethanol, ultrasound-assisted extraction was carried out with an ultrasound power of 100 W for 2 min, 5 min, 10 min, 20 min, 30 min and 40 min, respectively, and the extraction effects were tested. The test results are shown in Table 3. As can be seen from Table 3, the ultrasound-assisted extraction for 10 min had the best extraction effects.

TABLE 3

Extraction effects of different ultrasound-assisted extraction times (mg/g)

| No. | Holding time | Component | 2 min | 5 min | 10 min | 20 min | 30 min | 40 min |
|---|---|---|---|---|---|---|---|---|
| 1 | 11.087 | Furfural | 0.32 | 0.74 | 1.06 | 1.03 | 1.05 | 0.62 |
| 2 | 11.963 | Furfuryl alcohol | 0.39 | 0.84 | 1.13 | 1.09 | 0.97 | 0.58 |
| 3 | 12.428 | Ethylene glycol diacetate | 0.21 | 0.41 | 0.52 | 0.49 | 0.51 | 0.34 |
| 4 | 13.016 | 1-(1,3-dioxolan-2-yl)acetone | 0.17 | 0.34 | 0.51 | 0.48 | 0.49 | 0.32 |
| 5 | 13.258 | 4-cyclopentene-1,3-dione | 0.18 | 0.37 | 0.51 | 0.49 | 0.43 | 0.38 |
| 6 | 14.240 | Methylcyclopentenolone | 0.17 | 0.34 | 0.44 | 0.43 | 0.38 | 0.27 |
| 7 | 14.406 | Nicotine | 0.79 | 1.72 | 2.44 | 2.17 | 1.92 | 0.78 |
| 8 | 14.446 | 2-acetylfuran | 0.13 | 0.23 | 0.28 | 0.28 | 0.42 | 0.16 |
| 9 | 14.646 | 2(5H)-furanone | 0.16 | 0.34 | 0.42 | 0.43 | 0.43 | 0.24 |
| 10 | 16.934 | 5-methylfurfural | 0.58 | 1.24 | 1.56 | 1.52 | 1.52 | 0.64 |
| 11 | 17.051 | 3-methyl-2-cyclopenten-1-one | 0.38 | 0.76 | 0.87 | 0.86 | 0.83 | 0.57 |
| 12 | 20.257 | Methylcyclopentenolone | 0.61 | 1.30 | 1.67 | 1.73 | 1.56 | 0.72 |
| 13 | 20.545 | Benzyl alcohol | 0.18 | 0.39 | 0.48 | 0.49 | 0.43 | 0.28 |
| 14 | 20.745 | 2,3-dimethyl-2-cyclopentenone | 0.45 | 0.94 | 1.27 | 1.11 | 0.98 | 0.57 |
| 15 | 24.792 | Ethylcyclopentenolone | 0.23 | 0.42 | 0.53 | 0.50 | 0.45 | 0.31 |
| 16 | 30.262 | 5-hydroxymethylfurfural | 0.48 | 1.01 | 1.33 | 1.24 | 1.10 | 0.67 |
| 17 | 37.938 | Vanillin | 0.27 | 0.49 | 0.68 | 0.71 | 0.64 | 0.38 |
| 18 | 45.367 | Megastigmatrienone A | 0.38 | 0.77 | 0.99 | 1.02 | 0.90 | 0.45 |
| 19 | 45.820 | 2,4,4-trimethylpentane-1,3-diyl bis(2-methylpropionate) | 0.22 | 0.44 | 0.58 | 0.55 | 0.49 | 0.36 |
| 20 | 56.972 | Farnesol | 0.16 | 0.35 | 0.46 | 0.43 | 0.38 | 0.28 |
| 21 | 58.684 | Phthalic acid 1-butyl 2-isobutyl ester | 0.29 | 0.54 | 0.76 | 0.71 | 0.63 | 0.36 |

TABLE 3-continued

Extraction effects of different ultrasound-assisted extraction times (mg/g)

| No. | Holding time | Component | \multicolumn{6}{c}{Extraction solvent} |
|---|---|---|---|---|---|---|---|---|
| | | | 2 min | 5 min | 10 min | 20 min | 30 min | 40 min |
| 22 | 59.096 | Scopoletin | 0.26 | 0.48 | 0.61 | 0.62 | 0.63 | 0.34 |
| 23 | 64.684 | Tributyl prop-1-ene-1,2,3-tricarboxylate | 0.24 | 0.47 | 0.60 | 0.57 | 0.60 | 0.35 |
| | | Total amount | 7.25 | 14.93 | 19.70 | 18.93 | 17.76 | 9.97 |

Example 4

A method for extracting tar aroma components from a cigarette butt included the following steps:
(1) pretreating of the cigarette butt: outer wrapping paper of the cigarette butt was torn off, and a tow was cut into small segments with a length of less than 1 cm;
(2) 100 g of the pretreated cigarette butt was added to 500 mL of anhydrous ethanol and ultrasound-assisted extraction was carried out with an ultrasound power of 60 W for 10 min to obtain an extraction solution;
(3) the extraction solution was centrifuged at 500 r/min for 3 min, and vacuum distillation was carried out on the supernatant at 25° C. under 0.08 Mpa to obtain a concentrated extractum; and
(4) two-stage molecular distillation was carried out on the concentrated extractum, wherein first-stage molecular distillation was carried out at a heating temperature of 50° C. under a pressure of 200 Pa at a feed rate of 600 mL/h and a film wiping speed of 300 rpm; and second-stage molecular distillation was carried out at a heating temperature of 90° C. under a pressure of 60 Pa at a feed rate of 600 mL/h and a film wiping speed of 300 rpm; and light fractions of the first-stage molecular distillation and the second-stage molecular distillation were mixed.

Example 5

A method for extracting tar aroma components from a cigarette butt included the following steps:
(1) pretreating of the cigarette butt: outer wrapping paper of the cigarette butt was torn off, and a tow was cut into small segments with a length of less than 1 cm.
(2) 100 g of the pretreated cigarette butt was added to 2 L of anhydrous ethanol and ultrasound-assisted extraction was carried out with an ultrasound power of 120 W for 10 min to obtain an extraction solution.
(3) the extraction solution was centrifuged at 2000 r/min for 1 min, and vacuum distillation was carried out on the supernatant at 45° C. under 0.06 Mpa to obtain a concentrated extractum.
(4) two-stage molecular distillation was carried out on the concentrated extractum, wherein first-stage molecular distillation was carried out at a heating temperature of 80° C. under a pressure of 100 Pa at a feed rate of 300 mL/h and a film wiping speed of 200 rpm; and second-stage molecular distillation was carried out at a heating temperature of 110° C. under a pressure of 40 Pa at a feed rate of 300 mL/h and a film wiping speed of 200 rpm; and light fractions of the first-stage molecular distillation and the second-stage molecular distillation were mixed.

Example 6

This example was different from Example 5 in that: in the step (4), one-stage molecular distillation was carried out on the concentrated extractum, wherein the molecular distillation was carried out at a heating temperature of 80° C. under a pressure of 100 Pa at a feed rate of 300 mL/h and a film wiping speed of 200 rpm, thereby obtaining a light fraction. The rest were the same as the steps in the method in Example 5.

The light fraction prepared in this example was added to a reconstituted tobacco blend in an amount of 3% (by mass) of the HnB reconstituted tobacco blend to prepare an HnB sample 6 #.

Example 7

This example was different from Example 5 in that: in the step (4), one-stage molecular distillation was carried out on the concentrated extractum, wherein the molecular distillation was carried out at a heating temperature of 110° C. under a pressure of 40 Pa at a feed rate of 300 mL/h and a film wiping speed of 200 rpm, thereby obtaining a light fraction. The rest were the same as the steps in the method in Example 5.

The light fractions prepared in Examples 4-7 were tested for their types and contents thereof. The test results showed that the types and contents of the light fractions prepared in Examples 4-5 were greater than those of the light fractions prepared in Examples 6-7.

The light fractions prepared in Examples 4-7 were respectively added to a reconstituted tobacco blend in an amount of 3% (by mass) of the HnB reconstituted tobacco blend to prepare an HnB sample 4 #, an HnB sample 5 #, an HnB sample 6 #and an HnB sample 7 #. After the cigarette samples were equilibrated in a constant-temperature and constant-humidity environment of $(20\pm1°)$ C. and $(60\pm3)\%$ RH for 24 h, 20 or more smoking evaluators were organized to perform sensory evaluation on the cigarette samples with reference to Tobacco in processing-Sensory evaluation methods (YC/T 415-2011). The evaluation results are shown in Table 4.

TABLE 4

Sensory evaluation results

| Evaluation sample | | HnB sample 4# | HnB sample 5# | HnB sample 6# | HnB sample 7# |
|---|---|---|---|---|---|
| Aroma characteristics | Quality of aroma | 5.50 | 5.75 | 5.25 | 5.25 |
| | Quantity of aroma | 5.25 | 5.50 | 5.00 | 5.25 |
| | Stability | 4.25 | 4.50 | 4.25 | 4.25 |

TABLE 4-continued

Sensory evaluation results

| Evaluation sample | | HnB sample 4# | HnB sample 5# | HnB sample 6# | HnB sample 7# |
|---|---|---|---|---|---|
| | Offensive odor | 5.25 | 5.25 | 5.00 | 5.00 |
| | Plumpness of aroma | 5.25 | 5.50 | 5.00 | 5.25 |
| Smoke characteristics | Concentration | 5.50 | 5.50 | 5.25 | 5.25 |
| | Strength | 5.50 | 5.75 | 5.25 | 5.50 |
| | Harshness | 5.25 | 5.25 | 5.00 | 5.00 |
| | Agglomeration | 5.50 | 5.50 | 5.25 | 5.25 |
| | Stability | 4.50 | 4.50 | 4.25 | 4.25 |
| Taste characteristics | Irritancy | 5.50 | 5.75 | 5.25 | 5.50 |
| | Dry feeling | 5.50 | 5.75 | 5.25 | 5.25 |
| | Clean degree | 5.50 | 5.50 | 5.25 | 5.25 |
| | Sweet aftertaste | 5.00 | 5.00 | 5.00 | 5.00 |

As can be seen from the results in Table 4, after the light fractions prepared in the examples of the present disclosure were added to the cigarette, the aroma characteristics, the smoke characteristics and the taste characteristics of the cigarette were improved to different degrees, and the problems of insipidness and insufficient plumpness of aroma of the heat-not-burn cigarettes were solved effectively.

The above are only examples of the present application, and the protection scope of the present application is not limited by these specific examples, but is determined by the claims of the present application. For those skilled in the art, various modifications and variations can be made to the present application. Any modification, equivalent replacement or improvement made within the technical ideas and principle of the present application shall fall within the protection scope of the present application.

What is claimed is:

1. A method for extracting tar aroma components from a cigarette butt, comprising following steps:
    (1) adding the cigarette butt to an extraction solvent, and carrying out ultrasound-assisted extraction to obtain an extraction solution,
        the extraction solvent is at least one of methanol, anhydrous ethanol, petroleum ether and dichloromethane,
        the ultrasound-assisted extraction is carried out with an ultrasound power of 60-120W for 5-30 min;
    (2) centrifuging the extraction solution, and carrying out vacuum distillation on a supernatant to obtain a concentrated extractum; and
    (3) carrying out two-stage molecular distillation on the concentrated extractum, and collecting light fractions of a first-stage molecular distillation and a second-stage molecular distillation to obtain the tar aroma components,
    wherein the first-stage molecular distillation is carried out at a heating temperature of 50-80° C. under a pressure of 100-200 Pa at a feed rate of 300-600 mL/h and a film wiping speed of 200-300 rpm;
    wherein the second-stage molecular distillation is carried out at a heating temperature of 90-110° C. under a pressure of 40-60 Pa at a feed rate of 300-600 mL/h and a film wiping speed of 200-300 rpm;
    wherein the light fractions comprise at least one component from among components of ethylene glycol diacetate, 1-(1,3-dioxolan-2-yl)acetone, 4-cyclopentene-1,3-dione, methylcyclopentenolone, 2-acetylfuran, 2(5H)-furanone, 5-methylfurfural, 3-methyl-2-cyclopenten-1-one, 2,3-dimethyl-2-cyclopentenone, ethylcyclopentenolone, 5-hydroxymethylfurfural, vanillin, 2,4,4-trimethylpentane-1,3-diyl bis(2-methylpropionate), phthalic acid 1-butyl 2-isobutyl ester and tributyl prop-1-ene-1,2,3-tricarboxylate.

2. The method according to claim 1, wherein in the step (1), a ratio of the cigarette butt to the extraction solvent is 1 g:5-20 ml.

3. The method according to claim 1, wherein in the step (2), the centrifuging is carried out at 500-2000 r/min for 1-3 min; and
    the vacuum distillation is carried out at a temperature of 25-45° C. under a vacuum degree of 0.06-0.08 Mpa.

4. The method according to claim 1, further comprising a step of pretreating the cigarette butt.

5. The method according to claim 4, wherein the pretreating specifically comprises:
    tearing off outer wrapping paper from the cigarette butt, and cutting a tow into small segments with a length of less than 1 cm.

* * * * *